(12) United States Patent
Lee et al.

(10) Patent No.: US 10,932,125 B2
(45) Date of Patent: Feb. 23, 2021

(54) ELECTRONIC DEVICE FOR RECOGNIZING SIM CARD AND OPERATION METHOD THEREOF

(71) Applicant: Samsung Electronics Co., Ltd., Gyeonggi-do (KR)

(72) Inventors: Shinduck Lee, Daegu (KR); Hyunchul Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/620,993

(22) PCT Filed: Jun. 18, 2018

(86) PCT No.: PCT/KR2018/006862
§ 371 (c)(1),
(2) Date: Dec. 10, 2019

(87) PCT Pub. No.: WO2018/231033
PCT Pub. Date: Dec. 20, 2018

(65) Prior Publication Data
US 2020/0128397 A1 Apr. 23, 2020

(30) Foreign Application Priority Data
Jun. 16, 2017 (KR) .................. 10-2017-0076385

(51) Int. Cl.
*H04W 12/00* (2009.01)
*H04W 8/18* (2009.01)
(Continued)

(52) U.S. Cl.
CPC ......... *H04W 12/004* (2019.01); *H04W 8/183* (2013.01); *H04W 12/06* (2013.01); *H04W 88/02* (2013.01)

(58) Field of Classification Search
CPC ... H04W 12/004; H04W 8/183; H04W 12/06; H04W 88/02; H04M 1/667; H04M 1/725
See application file for complete search history.

(56) References Cited

U.S. PATENT DOCUMENTS 6,138,005 A * 10/2000 Park .................. G06F 21/31
455/411
9,198,026 B2 11/2015 Holtmanns et al.
(Continued)

FOREIGN PATENT DOCUMENTS

KR 10-2005-0022641 A 3/2005
KR 10-2005-0080333 A 8/2005
(Continued)

*Primary Examiner* — Joseph E Dean, Jr.
(74) *Attorney, Agent, or Firm* — Cha & Reiter, LLC

(57) ABSTRACT

Various embodiments of the present invention relate to an electronic device for recognizing a SIM card. The electronic device may comprise: a display; a SIM card including at least one subscriber identification module; a processor electrically connected to the display and the SIM card; and a memory electrically connected to the processor, wherein in the memory stores instructions which, when executed, cause the processor to: identify whether a SIM lock is activated or not, on the basis of the at least one subscriber identification module included in the SIM card; and when it is identified that at least one subscriber identification module, the SIM lock of which has been deactivated, display a screen corresponding to the subscriber identification module, the SIM lock of which has been deactivated. Another embodiment is possible.

15 Claims, 8 Drawing Sheets

(51) Int. Cl.
*H04W 12/06* (2021.01)
*H04W 88/02* (2009.01)

(56) References Cited

U.S. PATENT DOCUMENTS

| | | |
|---|---|---|
| 2006/0105812 A1 | 5/2006 | Shin |
| 2009/0088211 A1 | 4/2009 | Kim |
| 2012/0289197 A1 | 11/2012 | Holtmanns et al. |
| 2013/0281054 A1* | 10/2013 | Ye .......................... H04W 4/60 |
| | | 455/410 |
| 2015/0327066 A1* | 11/2015 | Auvray ................. H04W 12/06 |
| | | 726/5 |
| 2016/0029204 A1* | 1/2016 | Lalwaney ............. H04W 8/205 |
| | | 455/418 |
| 2017/0245137 A1 | 8/2017 | Cho et al. |

FOREIGN PATENT DOCUMENTS

| | | |
|---|---|---|
| KR | 10-0576523 B1 | 5/2006 |
| KR | 10-2009-0032678 A | 4/2009 |
| KR | 10-2010-0112402 A | 10/2010 |
| KR | 10-2017-0023052 A | 3/2017 |

\* cited by examiner

ELECTRONIC DEVICE FOR RECOGNIZING SIM CARD AND OPERATION METHOD THEREOF

CROSS REFERENCE TO RELATED APPLICATIONS

This application is a National Phase Entry of PCT International Application No. PCT/KR2018/006862, which was filed on Jun. 18, 2018, and claims a priority to Korean Patent Application No. 10-2017-0076385, which was filed on Jun. 16, 2017, the contents of which are incorporated herein by reference.

TECHNICAL FIELD

Various embodiments of the disclosure relates to an operation method by an electronic device for recognizing a SIM card including at least one subscriber identification module.

BACKGROUND ART

A communication service provider may authenticate users based subscriber identification information received from respective portable electronic devices, and it may provide communication services to the authentication-completed users. In order to use the communication services, the respective portable electronic devices may store user authentication information in card media (e.g., SIM cards) mounted on the portable electronic devices.

A portable electronic device may be mounted with a subscriber identification module (SIM) card including at least one SIM to use several phone numbers at the same time. The SIM card may include at least one SIM. For example, the SIM card may include at least one of an embedded SIM, a virtual SIM, a subscriber Identity module (SIM) of a GSM system, a universal subscriber identity module (USIM) of a universal mobile telecommunication system (UMTS), a user identity module (UIM) of a code division multiple access (CDMA) system, and a removal user identity module (RUIM). The portable electronic device mounted with the SIM card may activate and use at least one subscriber identification module among a plurality of subscriber identification modules included in the SIM card. Further, the portable electronic device may select and use at least one subscriber identification module among a plurality of activated subscriber identification modules. The portable electronic device mounted with the SIM card may provide a user interface (UI) to facilitate the selection of the subscriber identification module included in the SIM card.

DISCLOSURE OF INVENTION

Technical Problem

A portable electronic device may configure a SIM lock corresponding to each subscriber identification module in order to limit the use of the subscriber identification module included in a SIM card. The SIM-lock configured (e.g., SIM-lock activated) subscriber identification module may release (e.g., deactivate) the SIM lock based on a preconfigured authentication code. The portable electronic device may use a communication service corresponding to the SIM-lock released subscriber identification module. If the SIM lock is configured corresponding to at least one of a plurality of subscriber identification modules, the portable electronic device mounted with the SIM card including the plurality of subscriber identification module may be unable to use the communication service until the configured SIM lock is released.

The electronic device mounted with the SIM card according to various embodiments of the disclosure may identify whether to activate the SIM lock based on the at least one subscriber identification module included in the SIM card, and in the case of identifying the at least one SIM-lock deactivated subscriber identification module, the electronic device may display a screen corresponding to the at least one SIM-lock deactivated subscriber identification module.

Solution to Problem

According to various embodiments of the disclosure, an electronic device may include a display; a SIM card including at least one subscriber identification module; a processor electrically connected to the display and the SIM card; and a memory electrically connected to the processor, wherein the memory, when executed, stores instructions for causing the processor to: identify whether a SIM lock is activated based on the at least one subscriber identification module included in the SIM card, and display a screen corresponding to at least one SIM-lock deactivated subscriber identification module if the at least one SIM-lock deactivated subscriber identification module is identified.

According to various embodiments of the disclosure, an electronic device may include a housing; a touchscreen display exposed through a part of the housing; a communication processor configured to be connected to at least two subscriber identification modules (SIMs); an application processor electrically connected to the display and the communication processor; and a memory electrically connected to the application processor, wherein the memory, when executed, stores instructions for causing the application processor to: receive a first user input for configuring a SIM lock of a first subscriber identification module through the touchscreen display while a second subscriber identification module of the at least two subscriber identification modules is SIM-lock-released when the at least two subscriber identification modules are mounted on or built in the electronic device, receive a second user input when the electronic device is in a SIM-lock state or in a sleep state, release the SIM-lock state or the sleep state of the electronic device in response to the second user input, and display a screen on the touchscreen display, the screen including a first user interface for releasing the SIM lock of the first subscriber identification module and a second user interface for entering into a home screen without releasing the SIM lock of the first subscriber identification module.

Advantageous Effects of Invention

The electronic device according to the various embodiments of the disclosure can identify at least one SIM-lock deactivated subscriber identification module based on the at least one subscriber identification module included in the mounted SIM card, and it can display a screen corresponding to the at least one SIM-lock deactivated subscriber identification module. The various embodiments of the disclosure can increase usability of the electronic device.

MODE FOR THE INVENTION

Figure 1:
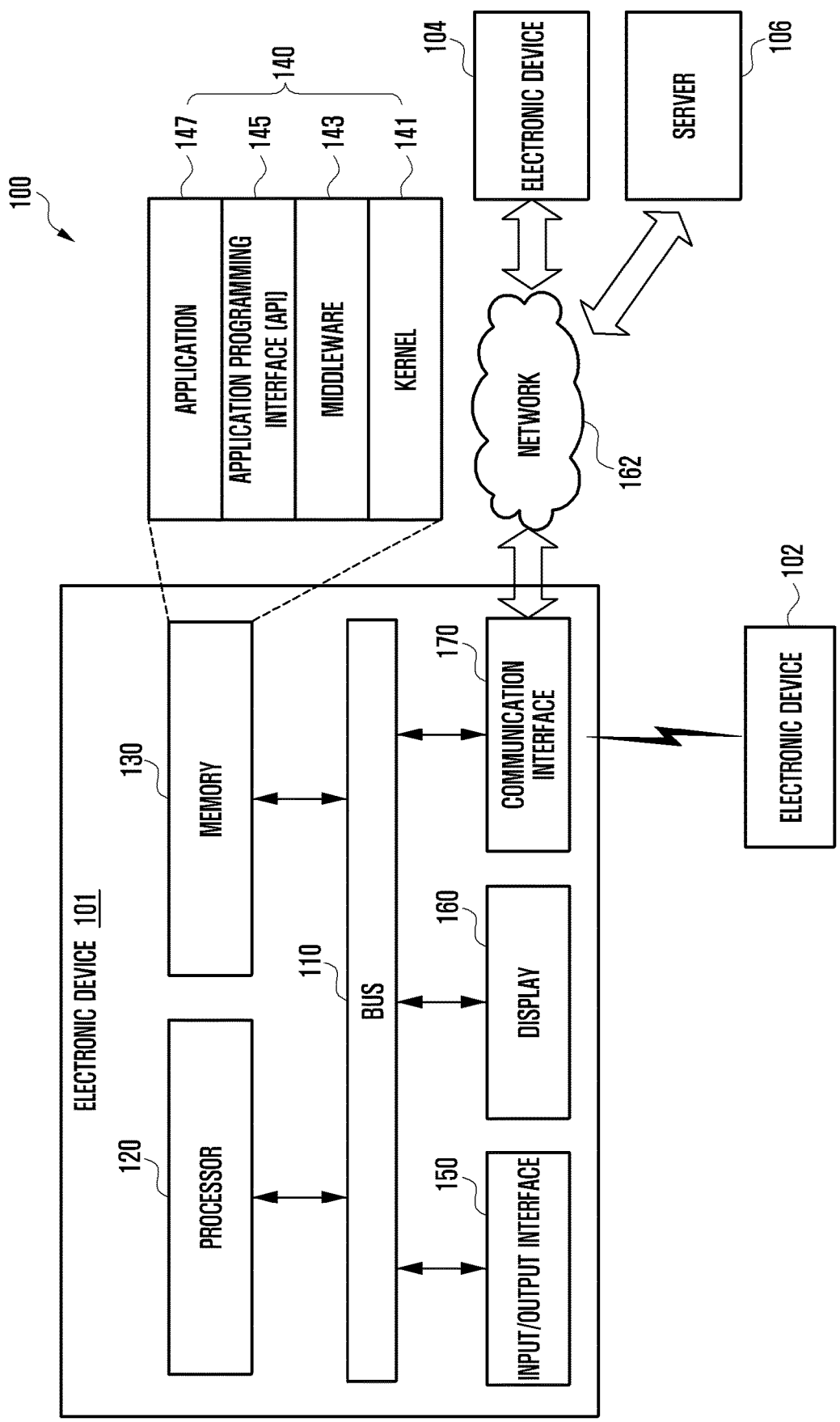
FIG. 1 is a diagram illustrating an electronic device in a network environment according to various embodiments of the disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

In the present disclosure, the expression "configured (or set) to do" may be used to be interchangeable with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

It should be appreciated that various embodiments of the present disclosure and the terms used therein are not intended to limit the technological features set forth herein to particular embodiments and include various changes, equivalents, or replacements for a corresponding embodiment. Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

An electronic device according to various embodiments of the disclosure may be mounted with a SIM card including at least one subscriber identification module. The SIM card may include a plurality of subscriber identification modules. The electronic device according to various embodiments may be mounted with a plurality of SIM cards. The electronic device according to various embodiments may select one of at least one subscriber identification module included in a SIM card, and it may provide a user with a communication service corresponding to the selected subscriber identification module.

An electronic device according to various embodiments of the present invention may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch).

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), which are equipped with an antenna. The electronic device according to various embodiments of the present invention may also be a combination of the devices listed above. Further, the electronic device according to various embodiments of the present disclosure may be a flexible device. It is apparent to those skilled in the art that the electronic device according to various embodiments of the present invention is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 illustrates a network environment 100 including an electronic device 101 according to various embodiments of the present disclosure.

Referring to FIG. 1, the electronic device 101, 102, 104 may connect to the server 106 via the network 162 or short-wireless communication 164.

The electronic device 101 may include a bus 110, a processor 120, a memory 130, an input/output interface 150, a display 160, and a communication interface 170. According to some embodiments, at least one of the above described components may be omitted from the electronic device 101 or another component may be further included in the electronic device 101. The bus 110 may be a circuit connecting the above described components 120, 130, and 150~170 and transmitting communications (e.g., control messages and/or data) between the above described components. The processor 120 is capable of including one or more of the following: a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS). The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests. The API 145 refers to an interface configured to allow the application programs 147 to control functions provided by the kernel 141 or the middleware 143. The API 145 is capable of including at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-wireless communication 164. Short-wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called "Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
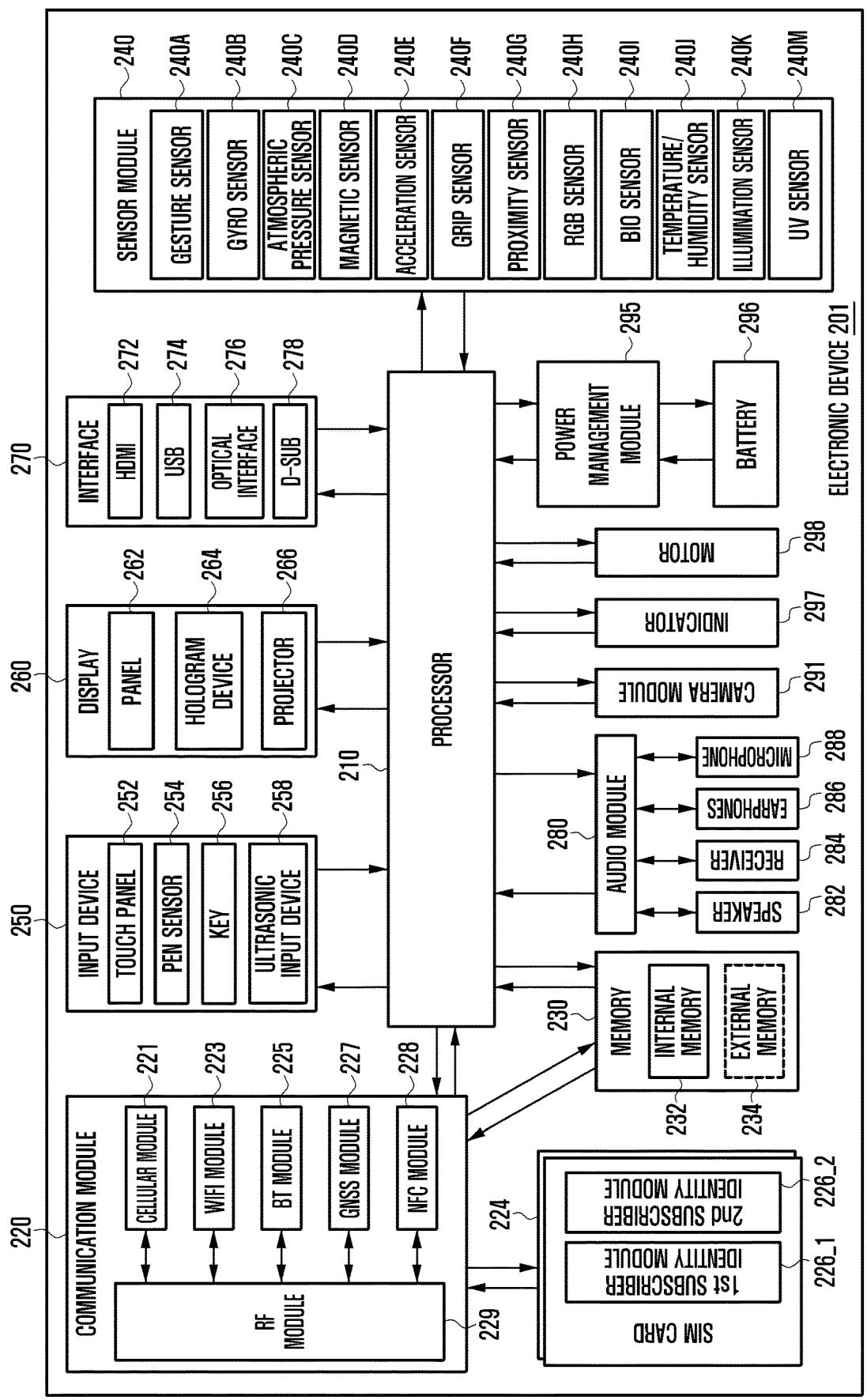
FIG. 2 is a block diagram of an electronic device according to various embodiments of the disclosure.

FIG. 2 is a detailed block diagram showing a configuration of an electronic device 201 according to various embodiments. For example, the electronic device 201 is capable of including part or all of the components in the electronic device 101 shown in FIG. 1. The electronic device 201 is capable of including one or more processors 210 (e.g., Application Processors (APs)), a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication module 170 is capable of including a cellular module 221, WiFi module 223, Bluetooth (BT) module 225, GNSS module 227 (e.g., a GPS module, Glonass module, Beidou module or Galileo module), NFC module 228, and Radio Frequency (RF) module 229. The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP). Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

A SIM card 224 may include at least one subscriber identification module (e.g., first subscriber identification module 226_1 and second subscriber identification module 226_2). For example, the SIM card may include at least one SIM. For example, the SIM card may include at least one of an embedded SIM, a virtual SIM, a SIM of a GSM system, a USIM of a UNITS system, a UIM of a CDMA system, and a RUIM. Although not illustrated, the SIM card 224 may include at least two SIM cards. The SIM card 224 may include, for example, a subscriber identification module or an embedded SIM, and it may include peculiar identification information (e.g., integrated circuit card identifier (ICCID)) or subscriber information (e.g., international mobile subscriber identity (IMSI)). An electronic device 201 according to various embodiments may identify whether to activate a SIM lock based on the at least one subscriber identification module (e.g., first subscriber identification module 226_1 and second subscriber identification module 226_2) included in the SIM card 224. For example, each subscriber identification module may determine whether to activate the SIM lock, and if the SIM lock is activated, it may deactivate the SIM lock based on an authentication code. The electronic device 201 according to various embodiments may select at least one subscriber identification module included in the SIM card 224, and it may display a screen corresponding to the selected subscriber identification module. The electronic device 201 can provide a user with a communication service corresponding to the selected subscriber identification module, and it can provide a limited communication service if the SIM lock for the selected subscriber identification module is activated.

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 is capable of including a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266. The display 260 may further include a touch-screen display.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc. The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc. The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

According to various embodiments, an electronic device 201 may include a display 260; a SIM card 224 including at least one subscriber identification module 226_1 and 226_2;

a processor 210 electrically connected to the display 260 and the SIM card 224; and a memory 230 electrically connected to the processor 210, wherein when the memory 230 is executed, the processor 210 may identify whether a SIM lock is activated based on the at least one subscriber identification module 226_1 and 226_2 included in the SIM card 224, and may display a screen corresponding to the at least one SIM-lock deactivated subscriber identification module if the at least one SIM-lock deactivated subscriber identification module is identified.

According to various embodiments, the processor may display a SIM-lock screen including an icon for displaying a home screen corresponding to the at least one SIM-lock deactivated subscriber identification module through the display 260 if the processor identifies the at least one SIM-lock deactivated subscriber identification module and at least one SIM-lock activated subscriber identification module.

According to various embodiments, the processor may sense a user input corresponding to the icon, and may display the home screen corresponding to the at least one SIM-lock deactivated subscriber identification module if the user input is sensed.

According to various embodiments, the SIM-lock screen may include an authentication code input region, and the processor may identify an authentication code input through the authentication code input region, and may deactivate a SIM lock corresponding to the at least one SIM-lock activated subscriber identification module based on the identified authentication code.

According to various embodiments, the processor may display a user interface for selecting the at least one subscriber identification module included in the SIM card, and may display a screen corresponding to the at least one subscriber identification module selected corresponding to a user input.

According to various embodiments, the processor may display a SIM-lock screen corresponding to at least one SIM-lock activated subscriber identification module if the SIM-lock activated subscriber identification module is selected.

According to various embodiments, the SIM card may include at least one of an embedded SIM, a virtual SIM, a SIM of a GSM system, a USIM of a UMTS system, a UIM of a CDMA system, or a RUIM.

According to various embodiments, an electronic device 201 may include a housing; a touchscreen display 260 exposed through a part of the housing; a communication processor 220 configured to be connected to at least two subscriber identification modules (SIMs); an application processor 210 electrically connected to the display 260 and the communication processor 220; and a memory 230 electrically connected to the application processor 210, wherein the memory 230 is executed, the application processor 210 may receive a first user input for configuring a SIM lock of a first subscriber identification module through the touchscreen display 260 while a second subscriber identification module of the at least two subscriber identification modules is SIM-lock-released when the at least two subscriber identification modules are mounted on or built in the electronic device 201, receive a second user input when the electronic device 201 is in a SIM-lock state or in a sleep state, release the SIM-lock state or the sleep state of the electronic device 201 in response to the second user input, and display a screen on the touchscreen display 260, wherein the screen includes a first user interface for releasing the SIM lock of the first subscriber identification module and a second user interface for entering into a home screen without releasing the SIM lock of the first subscriber identification module.

According to various embodiments, the first user interface may be configured to use a password or a pattern.

According to various embodiments, the communication processor 220 may be configured to use the second subscriber identification module while the first subscriber identification module is in a SIM-lock state.

Figure 3:
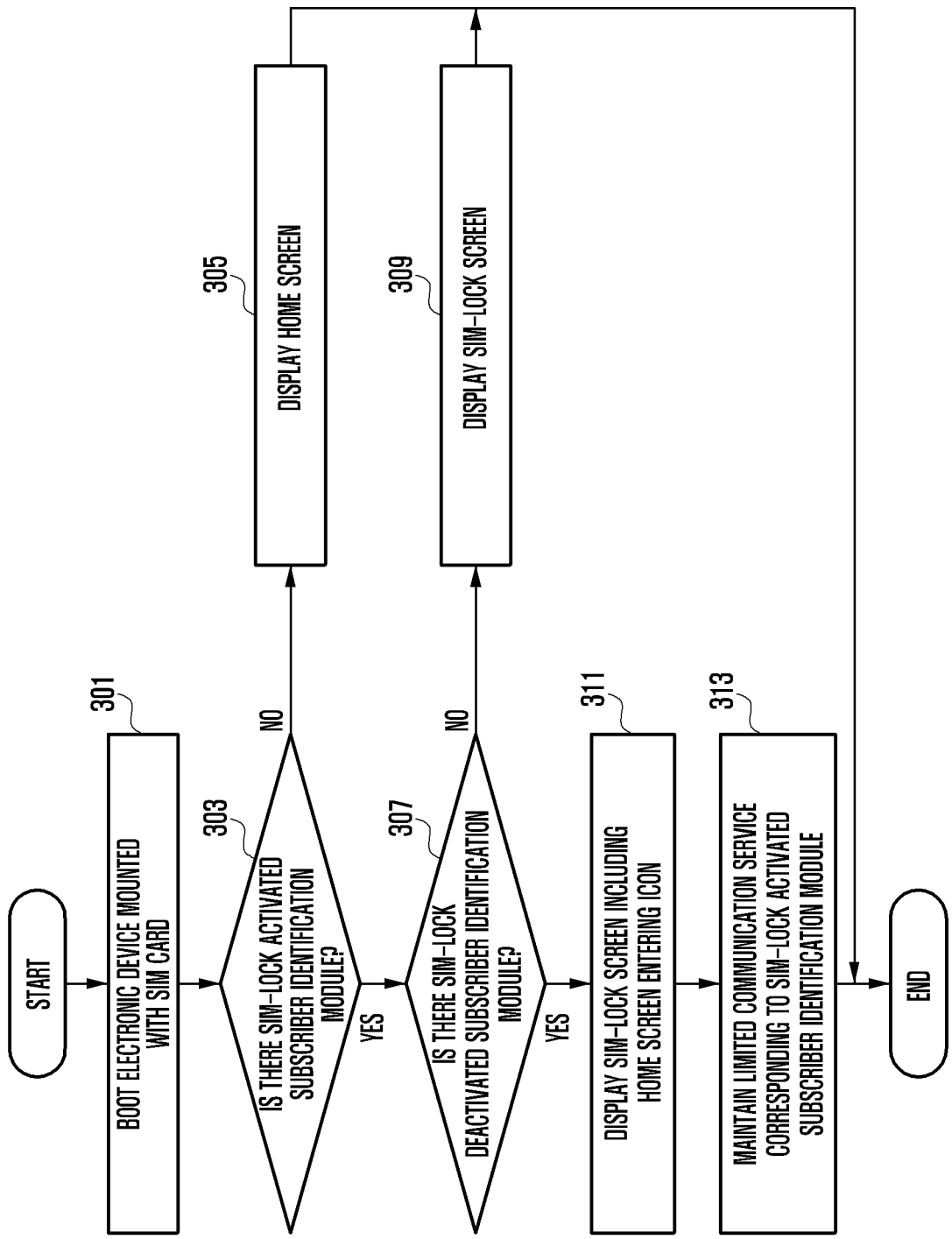
FIG. 3 is a flowchart explaining a first embodiment of identifying a SIM-lock deactivated subscriber identification module based on at least one subscriber identification module included in a SIM card and recognizing the SIM-lock deactivated subscriber identification module according to various embodiments of the disclosure.

FIG. 3 is a flowchart explaining a first embodiment of identifying a SIM-lock deactivated subscriber identification module based on at least one subscriber identification module included in a SIM card and recognizing the SIM-lock deactivated subscriber identification module according to various embodiments of the disclosure.

According to various embodiments, operations 301 to 313 may be executed through at least one of an electronic device (electronic device 201 of FIG. 2), a processor (processor 210 of FIG. 2), or a program (program 140 of FIG. 1).

FIG. 3 is a flowchart including an operation of displaying a SIM-lock screen including a home screen entering icon in recognizing a SIM-lock deactivated subscriber identification module.

With reference to FIG. 3, at operation 301, the electronic device 201 mounted with a SIM card according to various embodiments may be booted by a user. According to an embodiment, if a screen lock function (e.g., phone lock or lock screen) is configured in the electronic device 201 during booting, the electronic device 201 may perform the screen lock function. For example, after the booting at operation 301, the electronic device 201 may display a lock screen corresponding to the configured screen lock function. The electronic device 201 may release the screen lock function in response to a lock release input corresponding to the displayed lock screen. After releasing the configured screen lock function, the electronic device 201 may perform operation 303.

In an embodiment, during the booting, the electronic device 201 may provide a communication service to a user based on a SIM card (SIM card 224 of FIG. 2) mounted on the electronic device 201. According to various embodiments, the electronic device 201 may be mounted with the SIM card including at least one subscriber identification module (e.g., first subscriber identification module 226_1 and second subscriber identification module 226_2 of FIG. 2), and it may display a screen corresponding to each subscriber identification module through the display (display 260 of FIG. 2).

According to various embodiments, the electronic device 201 may be mounted with a plurality of SIM cards, and it may display screens corresponding to the subscriber identification modules included in the respective SIM cards. For example, the electronic device 201 may display a subscriber interface screen corresponding to each subscriber identification module for each subscriber identification module included in the mounted SIM card 224. For example, if the first subscriber identification module 226_1 and the second subscriber identification module 226_2 are included in the SIM card 224, the electronic device 201 may select one subscriber identification module, and it may display the subscriber interface screen corresponding to the selected subscriber identification module. The subscriber interface screen corresponding to the first subscriber identification module 226_1 and the subscriber interface screen corresponding to the second subscriber identification module 226_2 may be different from each other. According to various embodiments, the electronic device 201 may provide the user with an independent communication service for each subscriber identification module. For example, the SIM card may include at least one of an embedded SIM, a virtual SIM, a SIM of a GSM system, a USIM of a UMTS, a UIM of a CDMA system, or a RUIM.

According to various embodiments, at operation 303, the electronic device 201 may determine whether a SIM lock is activated based on each subscriber identification module included in the SIM card. For example, each subscriber identification module may determine whether to activate the SIM lock, and the SIM-lock activated subscriber identification module may deactivate (release) the SIM lock based on an authentication code. In order to use the SIM-lock activated subscriber identification module, the electronic device 201 may transmit the authentication code (e.g., password or pattern) for deactivating the SIM lock to a communication company server. The electronic device 201 may deactivate the SIM lock corresponding to the subscriber identification module through the communication company server. Hereinafter, the activated SIM lock may mean that the SIM lock has been configured, and the deactivated SIM lock may mean that the SIM lock has been released.

According to various embodiments, if there is no SIM-lock activated subscriber identification module at operation 303, the electronic device 201, at operation 305, may display a home screen without a SIM-lock screen (e.g., authentication code input screen) for releasing the SIM lock. In an embodiment, the electronic device 201 may display the home screen based on the SIM-lock deactivated subscriber identification module. For example, the electronic device 201 may select one of the plurality of subscriber identification modules included in the SIM card, and it may perform the communication service corresponding to the selected subscriber identification module. If the selected subscriber identification module is in a SIM-lock deactivated state, the electronic device 201 may display the home screen corresponding to the SIM-lock deactivated subscriber identification module, and it may provide the communication service to the user without limit based on the SIM-lock deactivated subscriber identification module. In an embodiment, if the SIM card includes at least one SIM-lock activated subscriber identification module, the electronic device may display the SIM-lock screen corresponding to the SIM-lock activated subscriber identification module, and it may provide a limited communication service to the user based on the SIM-lock activated subscriber identification module. For example, the electronic device may provide the user with the limited communication service for performing only a specific function such as an emergency call.

According to various embodiments, if a multi-SIM includes at least one SIM-lock activated subscriber identification module at operation 303, the electronic device 201, at operation 307, may determine whether at least one SIM-lock deactivated subscriber identification module is included among a plurality of subscriber identification modules included in the mounted SIM card. If the at least one SIM-lock deactivated subscriber identification module is not included at operation 307, the electronic device 201, at operation 309, may display a SIM-lock screen. The nonexistence of the at least one SIM-lock deactivated subscriber identification module at operation 307 may mean that all subscriber identification modules included in the SIM card are in SIM-lock activated state. At operation 309, the electronic device 201 may select one of the plurality of subscriber identification modules included in the SIM card, and it may display the SIM-lock screen corresponding to the selected subscriber identification module.

According to various embodiments, if at least one SIM-lock deactivated subscriber identification module is included in the SIM card at operation 307, the electronic device 201, at operation 311, may display the SIM-lock screen including an icon (button) for entering into a home screen. Further, the electronic device 201 may display an authentication code input region for inputting an authentication code on the SIM-lock screen, and it may receive the authentication code corresponding to the authentication code input region. The electronic device 201 may display the home screen corresponding to the SIM-lock deactivated subscriber identification module by deactivating the SIM lock of the SIM-lock activated subscriber identification module based on the received authentication code.

According to various embodiments, at operation 313, the electronic device 201 may maintain a limited communication service corresponding to the SIM-lock activated subscriber identification module. For example, if the electronic device 201 uses the SIM-lock deactivated subscriber identification module in the SIM-lock deactivated state, it may perform only the limited function, such as emergency call. The electronic device 201 may perform the limited function corresponding to the SIM-lock activated subscriber identification module until the SIM lock is deactivated.

Figure 4:
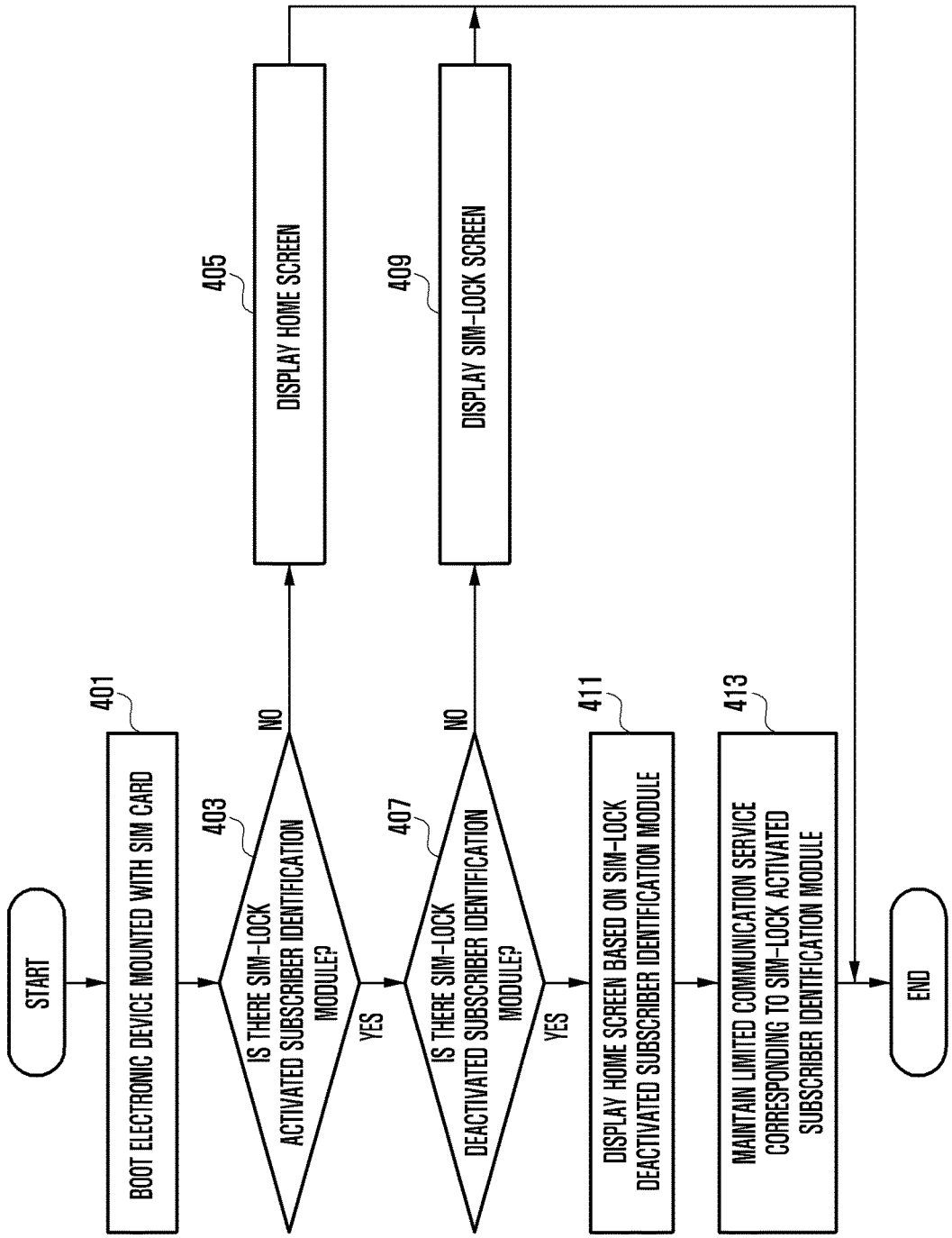
FIG. 4 is a flowchart explaining a second embodiment of identifying a SIM-lock deactivated subscriber identification module based on at least one subscriber identification module included in a SIM card and recognizing the SIM-lock deactivated subscriber identification module according to various embodiments of the disclosure.

FIG. 4 is a flowchart explaining a second embodiment of identifying a SIM-lock deactivated subscriber identification module based on at least one subscriber identification module included in a SIM card and recognizing the SIM-lock deactivated subscriber identification module according to various embodiments of the disclosure.

FIG. 4 is a flowchart including an operation of displaying a SIM-lock screen that does not include an icon for entering into a home screen in recognizing a SIM-lock deactivated subscriber identification module.

Operations 401 to 409 as illustrated in FIG. 4 may be equal to operations 301 to 309 as illustrated in FIG. 3. Accordingly, explanation of operations 301 to 309 as illustrated in FIG. 3 may substitute for explanation of operations 401 to 409 as illustrated in FIG. 4.

According to various embodiments, if at least one SIM-lock deactivated subscriber identification module is included in the SIM card at operation 407, the electronic device 201, at operation 411, may display a home screen based on the SIM-lock deactivated subscriber identification module. For example, the electronic device 201 may perform a communication service provided by a communication company corresponding to the SIM-lock deactivated subscriber identification module without limit.

According to various embodiments, at operation 413, the electronic device 201 may maintain a limited communication service corresponding to the SIM-lock activated subscriber identification module. For example, if the electronic device 201 uses the SIM-lock deactivated subscriber identification module in the SIM-lock deactivated state, it may perform only a limited function, such as emergency call. The electronic device 201 may perform the limited function corresponding to the SIM-lock activated subscriber identification module until the SIM lock is deactivated.

According to various embodiments, the electronic device 201 may display a user interface so that a user selects at least one of the plurality of subscriber identification modules included in the SIM card. For example, the electronic device 201 may display the user interface based on a notification window, and it may select the subscriber identification module corresponding to a user input. The notification window may be a user interface for the user to select the subscriber identification module. Further, the electronic device 201 may display a configuration window for selecting the subscriber identification module using a configuration menu (or configuration application), and it may select the subscriber identification module corresponding to the user input. In displaying the subscriber identification module in the notification window, the electronic device 201 may also display whether the SIM lock has been configured together.

According to various embodiments, if the SIM-lock configured subscriber identification module is selected by the user, the electronic device 201 may display a SIM-lock screen including a button for entering into a home screen. On the other hand, if the SIM-lock non-configured subscriber identification module is selected by the user, the electronic device 201 may display a SIM-lock screen that does not include an icon for entering into the home screen.

Figure 5:
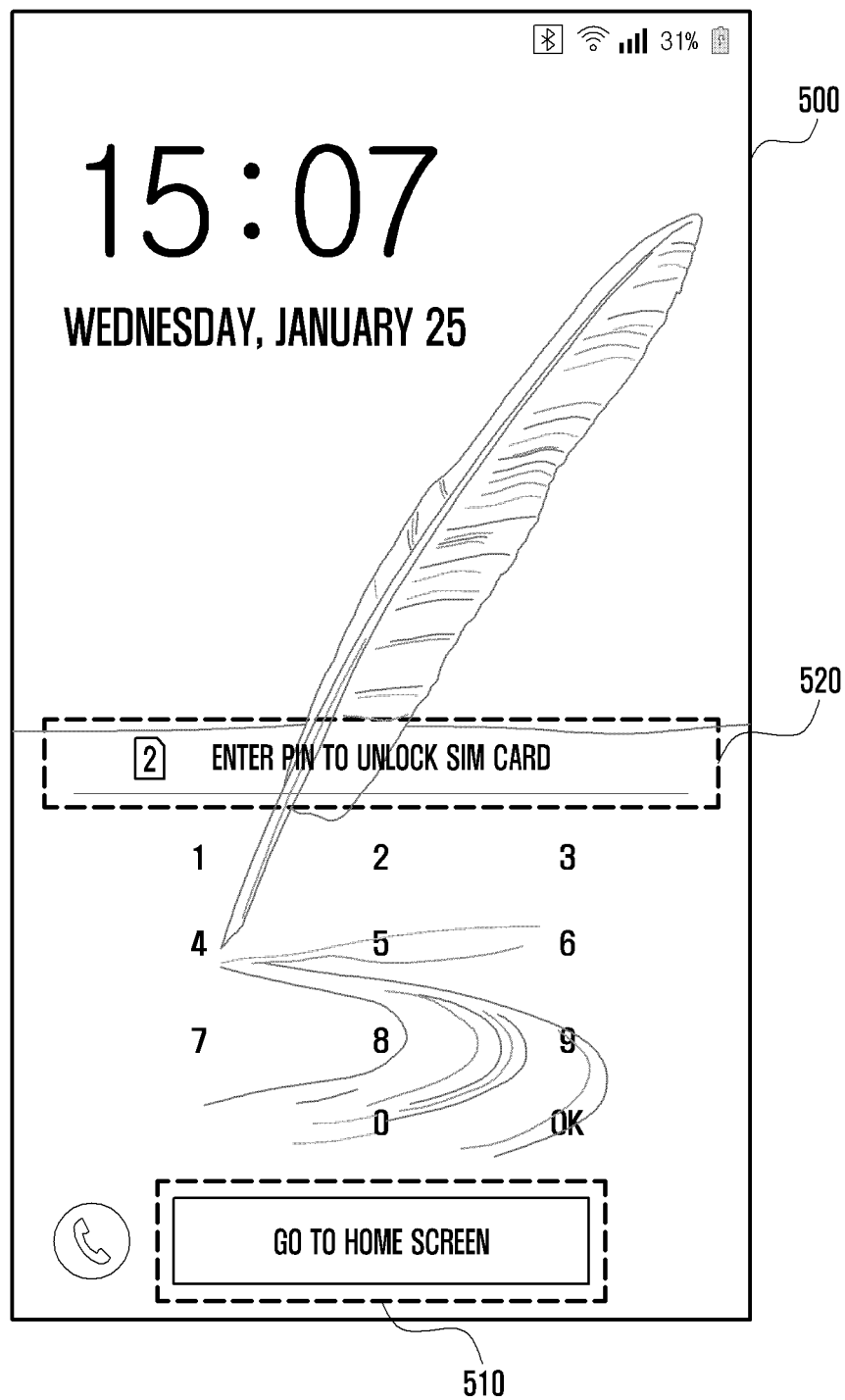
FIG. 5 is a diagram illustrating a user interface for entering into a home screen based on a SIM-lock deactivated subscriber identification module according to various embodiments of the disclosure.

FIG. 5 is a diagram illustrating a user interface for entering into a home screen based on a SIM-lock deactivated subscriber identification module according to various embodiments of the disclosure.

With reference to FIG. 5, the electronic device 201 may display a SIM-lock screen corresponding to a SIM-lock configured subscriber identification module. For example, during booting, the electronic device 201 mounted with the SIM card may discriminate a first SIM-lock deactivated subscriber identification module and a second SIM-lock activated subscriber identification module from each other based on a plurality of subscriber identification modules included in the SIM card (or a plurality of subscriber identification modules included in a plurality of SIM cards). If the first SIM-lock deactivated subscriber identification module and the second SIM-lock activated subscriber identification module are included in the SIM card, the electronic device 201 may display a SIM-lock screen 500 including an icon 510 for entering into a home screen. For example, if a user input corresponding to the icon 510 is sensed, the electronic device 201 may display a screen (e.g., home screen) corresponding to the first SIM-lock deactivated subscriber identification module. Further, the electronic device 201 may display an authentication code input region 520 on the SIM-lock screen 500. If an authentication code is received corresponding to the authentication code input region 520, the electronic device 201 may deactivate the SIM lock corresponding to the second SIM-lock activated subscriber identification module.

According to various embodiments, if the authentication code is received, the electronic device 201 may deactivate the SIM lock for the second subscriber identification module corresponding to the authentication code, and it may display a home screen corresponding to the second SIM-lock deactivated subscriber identification module.

According to various embodiments, the electronic device 201 may perform a communication service based on the SIM-lock deactivated subscriber identification module. For example, if the authentication code is received, the electronic device 201 may deactivate the SIM lock for the subscriber identification module corresponding to the authentication code, and it may perform the communication service without any specific limit. According to another embodiment, if an input of an icon 510 for entering into a home screen is received, the electronic device 201 may display the home screen corresponding to the SIM-lock deactivated subscriber identification module. The electronic device 201 may perform the communication service based on the SIM-lock deactivated subscriber identification module.

According to various embodiments, if at least one SIM-lock deactivated subscriber identification module is included in the SIM card, the electronic device 201 may provide the communication service to the user based on the SIM-lock deactivated subscriber identification module without the SIM-lock screen.

According to various embodiments, the electronic device 201 may display another SIM-lock screen corresponding to each subscriber identification module. For example, if a plurality of subscriber identification modules (e.g., first subscriber identification module and second subscriber identification module) are included in the SIM card, the electronic device 201 may select one subscriber identification module. For example, if the first subscriber identification module is selected in a state where the first subscriber identification module is SIM-lock-activated, the electronic device 201 may display a first SIM-lock screen corresponding to the first subscriber identification module. If the first subscriber identification module is selected in a state where the first subscriber identification module is SIM-lock-deactivated, the electronic device 201 may display the home screen. Further, if the second subscriber identification module is selected in a state where the second subscriber identification module is SIM-lock-activated, the electronic device 201 may display a second SIM-lock screen corresponding to the second subscriber identification module.

According to various embodiments, the electronic device 201 may select one of at least one subscriber identification module, of which the SIM-lock activation/deactivation is determined. The electronic device 201 may display the SIM-lock screen or the home screen depending on whether the selected subscriber identification module is SIM-lock-activated.

Figure 6A:
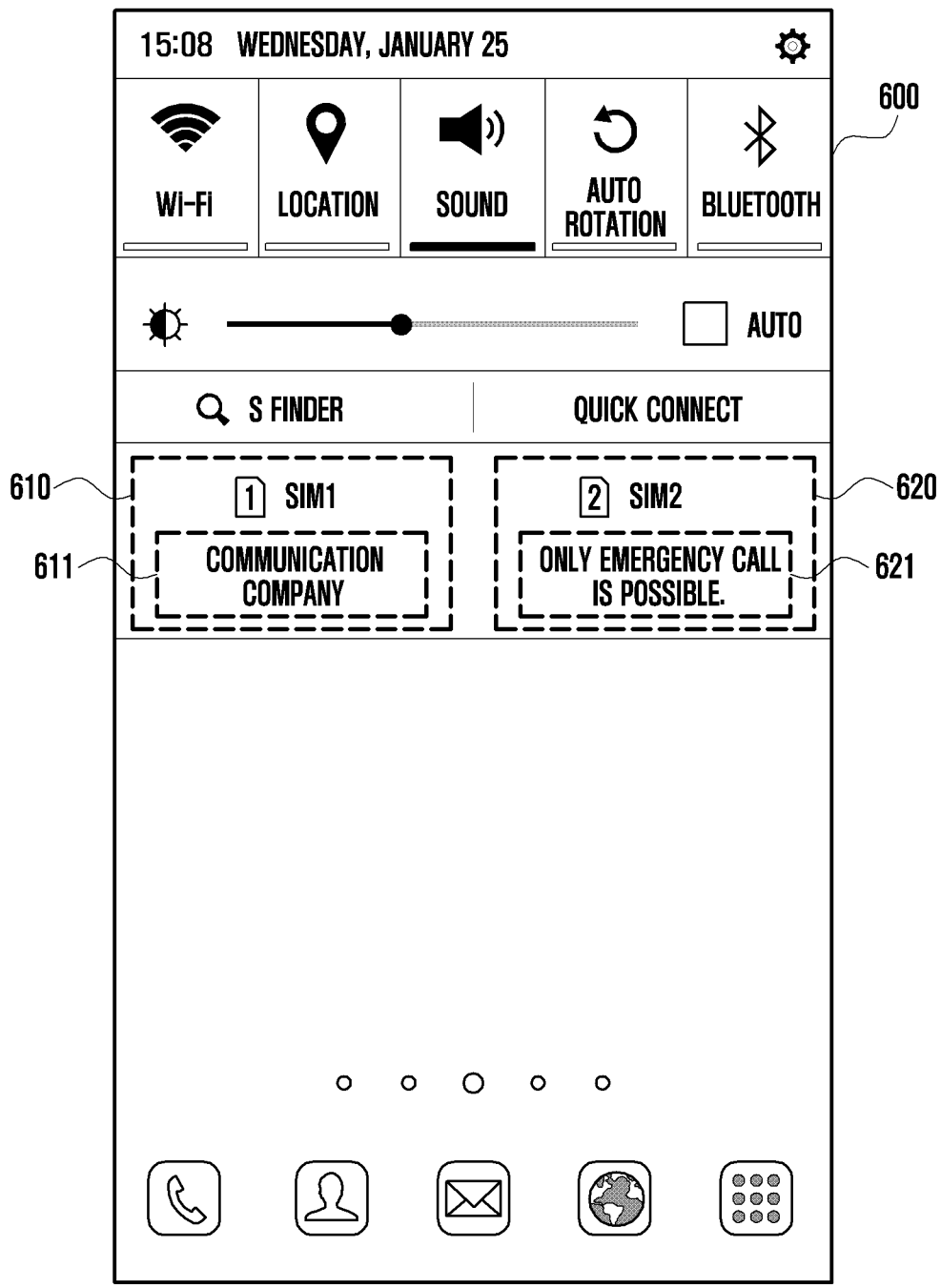
FIG. 6A is a diagram illustrating a user interface for entering into a home screen by selecting one of at least one subscriber identification module included in a SIM card according to various embodiments of the disclosure.
Figure 6B:
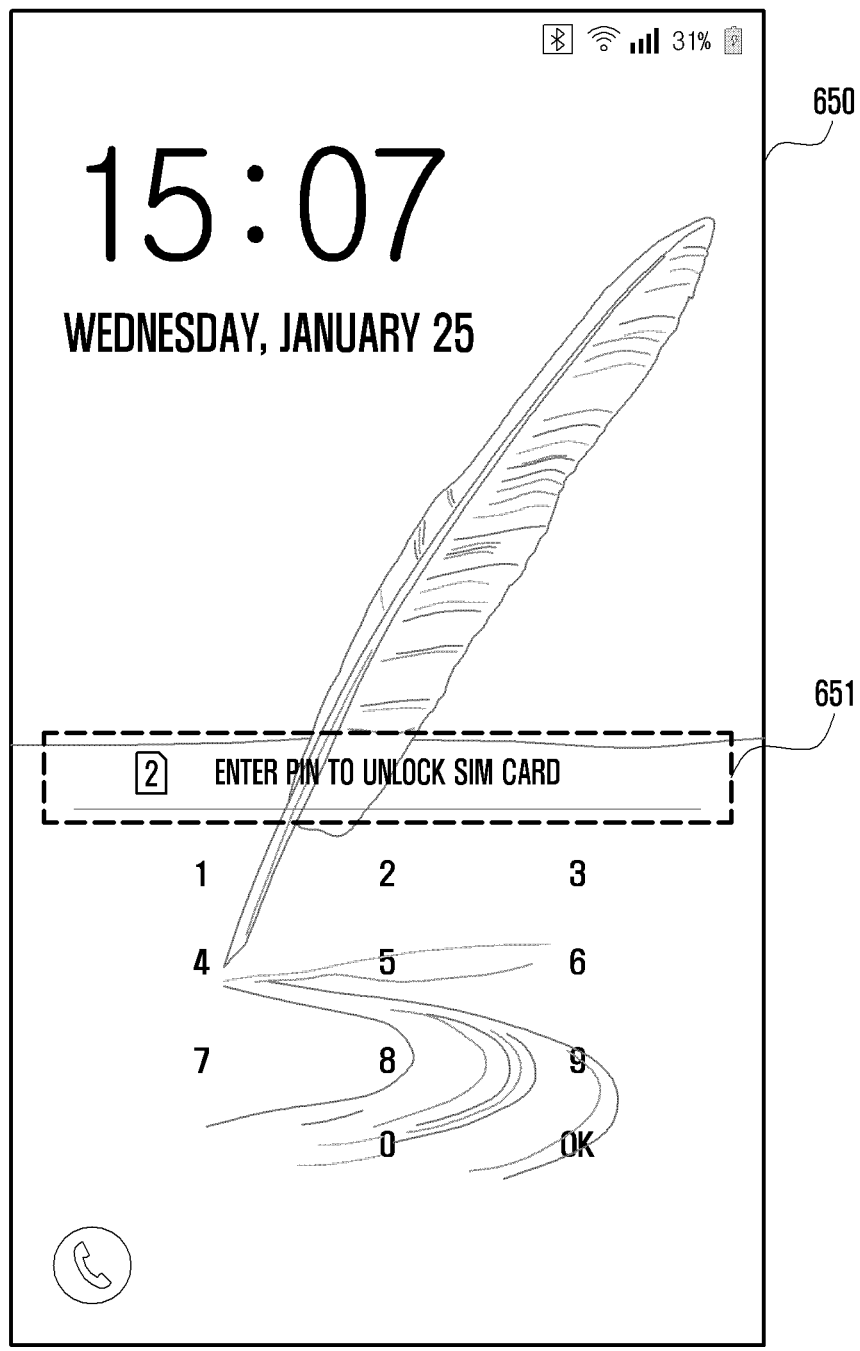
FIG. 6B is a diagram illustrating a user interface for entering into a home screen by selecting one of at least one subscriber identification module included in a SIM card according to various embodiments of the disclosure.

FIGS. 6A and 6B are diagrams illustrating a user interface for entering into a home screen by selecting one of at least one subscriber identification module included in a SIM card according to various embodiments of the disclosure.

With reference to FIG. 6A, the electronic device 201 may display a user interface for selecting at least one of a plurality of subscriber identification modules included in a SIM card. For example, the electronic device 201 may display a notification window 600 through a display 260, and it may select the subscriber identification module in response to a user input corresponding to the notification window 600. The notification window may be, for example, a user interface for a user to configure Wi-Fi, sound, and screen brightness. Further, the electronic device 201 may select the subscriber identification module based on a configuration menu.

With reference to FIG. 6A, the electronic device 201 may display a first subscriber identification module (SIM1) 610 and a second subscriber identification module (SIM2) 620, which are selectable and are included in the SIM card, through the notification window 600. For example, the first subscriber identification module 610 may be in a SIM-lock released (deactivated) state, and the second subscriber identification module 620 may be in a SIM-lock configured (activated) state. In displaying the selectable first subscriber identification module 610 and second subscriber identification module 620, the electronic device 201 may also display a communication company 611 corresponding to the respective subscriber identification modules or a limited function 621 together. In an embodiment, if the first subscriber identification module 610 is selected, the electronic device 201 may perform a communication service corresponding to the communication company 611 without a SIM-lock screen. Further, if the second subscriber identification module 620 is selected, the processor 210 may display the SIM-lock screen, and it may perform only the limited function 621, such as an emergency call.

FIG. 6B is a diagram illustrating a user interface corresponding to a SIM-lock screen 650 if a second SIM-lock configured subscriber identification module 620 is selected. With reference to FIG. 6B, if the second SIM-lock configured subscriber identification module is selected by a user, the electronic device 201 may display the SIM-lock screen 650 excluding an icon for entering into a home screen. According to various embodiments, the electronic device 201 may display an authentication code input region 651 and an input interface (e.g., numeral key or pattern) on the SIM-lock screen 650. If an authentication code corresponding to the second subscriber identification module is received through the authentication code input region 651, the electronic device 201 may deactivate the SIM lock for the second subscriber identification module. The electronic device may display a screen corresponding to the second SIM-lock deactivated subscriber identification module.

Figure 7:
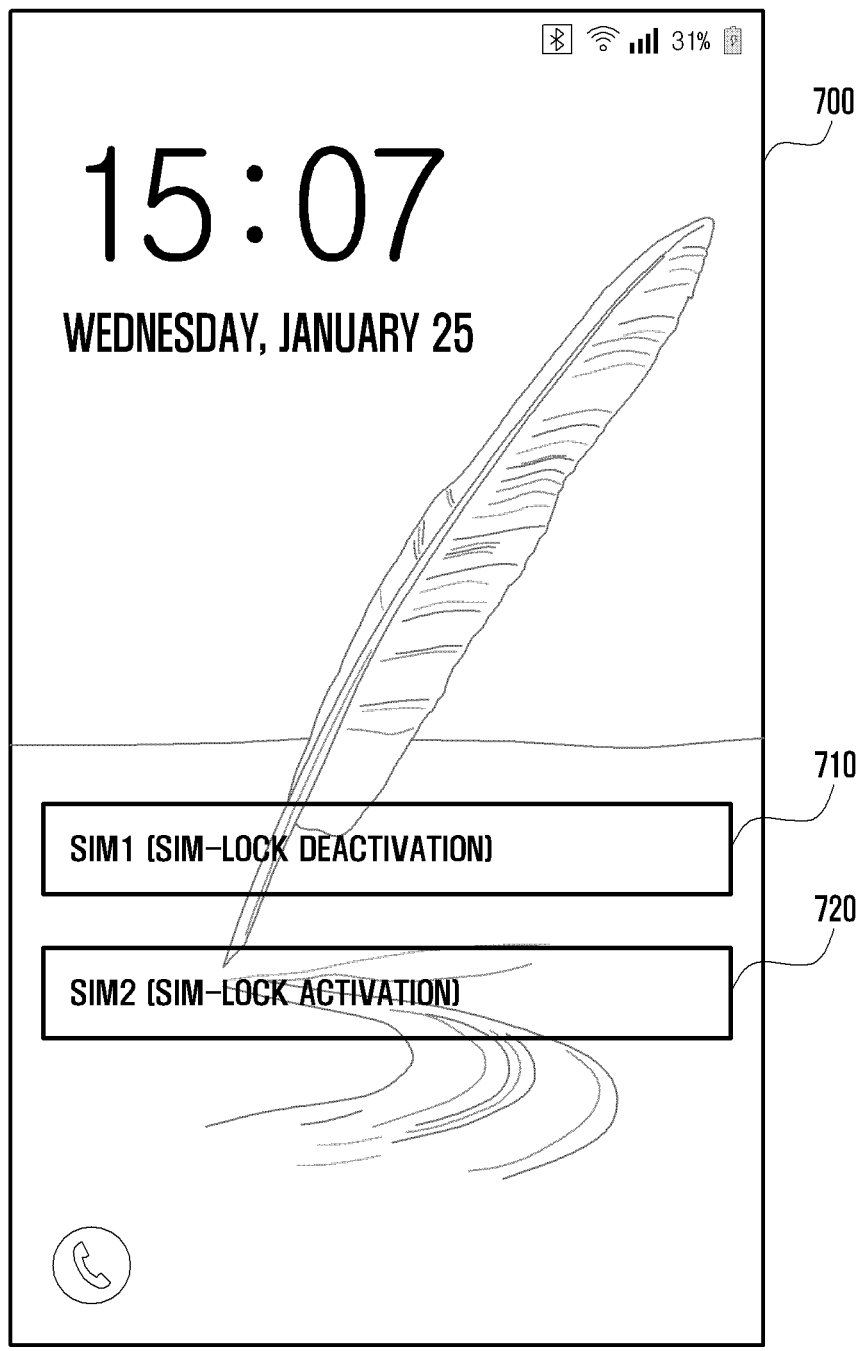
FIG. 7 is a diagram illustrating a user interface for selecting one of at least one subscriber identification module included in a SIM card according to various embodiments of the disclosure.

FIG. 7 is a diagram illustrating a user interface for selecting one of at least one subscriber identification module included in a SIM card according to various embodiments of the disclosure.

With reference to FIG. 7, the electronic device 201 may display a subscriber identification module selection screen 700 for selecting at least one of a plurality of subscriber identification modules included in a SIM card during booting. For example, the subscriber identification module selection screen 700 may include a selection button for selecting the subscriber identification module (e.g., first subscriber identification module (SIM1) 710 and second subscriber identification module (SIM2) 720). For example, the subscriber identification module may correspond to at least one of the plurality of subscriber identification modules included in the SIM card mounted on the electronic device 201, and it may be SIM-lock-configured (activated) or may not be SIM-lock-configured (deactivated).

With reference to FIG. 7, the first subscriber identification module 710 may be in a SIM-lock deactivated state, and the second subscriber identification module 720 may be in a SIM-lock activated state. If the first subscriber identification module 710 is selected by the user, the electronic device 201 may display a home screen corresponding to the first subscriber identification module 710. If the second subscriber identification module 720 is selected by the user, the processor 210 may display a SIM-lock screen corresponding to the second subscriber identification module 720 in order to release the SIM lock for the second subscriber identification module 720. For example, the SIM-lock screen corresponding to the second subscriber identification module 720 may be the screen of FIG. 6B.

According to various embodiments, the electronic device 201 may display a user interface for selecting the subscriber identification module during booting, and it may select the subscriber identification module corresponding to a user input. If the SIM lock is configured (activated) corresponding to the selected subscriber identification module, the electronic device 201 may perform a limited communication service, and if the SIM lock is not configured corresponding to the selected subscriber identification module, the electronic device 201 may perform the communication service without limit.

A method for operating an electronic device 201 according to various embodiments may include identifying whether a SIM lock is activated based on at least one subscriber identification module 226_1 and 226_2 included in a SIM card 224 mounted on the electronic device 201; and displaying a screen corresponding to at least one SIM-lock deactivated subscriber identification module if the at least one SIM-lock deactivated subscriber identification module is identified.

The method according to various embodiments may further include displaying a SIM-lock screen including an icon for displaying a home screen corresponding to the at least one SIM-lock deactivated subscriber identification module if the at least one SIM-lock deactivated subscriber identification module and at least one SIM-lock activated subscriber identification module are identified.

The method according to various embodiments may further includes sensing a user input corresponding to the icon, and displaying the home screen corresponding to the at least one SIM-lock deactivated subscriber identification module if the user input is sensed.

According to various embodiments, the SIM-lock screen may include an authentication code input region, and the method may further include receiving an authentication code input through the authentication code input region, and deactivating a SIM lock corresponding to the at least one SIM-lock activated subscriber identification module based on the received authentication code.

The method according to various embodiments may further include displaying a user interface for selecting the at least one subscriber identification module included in the SIM card, selecting the at least one subscriber identification module corresponding to the user input, and displaying a screen corresponding to the at least one selected subscriber identification module.

The method according to various embodiments may further include selecting at least one SIM-lock activated subscriber identification module, and displaying a SIM-lock screen corresponding to the SIM-lock activated subscriber identification module.

A method for operating an electronic device according to various embodiments may include receiving a first user input for configuring a SIM lock of a first subscriber identification module while a second subscriber identification module of at least two subscriber identification modules is SIM-lock-released when the at least two subscriber identification modules are mounted on or built in the electronic device; receiving a second user input when the electronic device is in a SIM-lock state or in a sleep state; releasing the SIM-lock state or the sleep state of the electronic device in response to the second user input; and displaying a screen on a touchscreen display, wherein the screen includes a first user interface for releasing the SIM lock of the first subscriber identification module and a second user interface for entering into a home screen without releasing the SIM lock of the first subscriber identification module.

According to various embodiments, the first user interface may use a password or a pattern.

The method for operating the electronic device according to various embodiments may use the second subscriber identification module while the first subscriber identification module is in a SIM-lock state.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be implemented mechanically or electronically, and may include, for example, an Application-Specific Integrated Circuit (ASIC) chip, a Field-Programmable Gate Array (FPGA), or a programmable logic device, which is known or is to be developed in the future, for performing certain operations. At least some of devices (e.g., modules or functions thereof) or methods (e.g., operations) according to various embodiments may be implemented as instructions which are stored a computer-readable storage medium (e.g., the memory 130) in the form of a program module. If the instructions are executed by a processor, the processor may perform a function corresponding to the instructions. The computer-readable storage medium may include a hard disk, a floppy disk, a magnetic medium (e.g., a magnetic tape), optical media (e.g., CD-ROM, DVD), magneto-optical media (e.g., a floptical disk), internal memory, etc. The instructions may include code compiled by a complier or code that can be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The invention claimed is:

1. An electronic device comprising:
   a display;
   a SIM card including at least one subscriber identification module;
   a processor electrically connected to the display and the SIM card; and
   a memory electrically connected to the processor,
   wherein the memory, when executed, stores instructions for causing the processor to:
   identify whether a SIM lock corresponding to a first subscriber identification module is deactivated based on the at least one subscriber identification module included in the SIM card, and
   display a screen corresponding to the first subscriber identification module if the SIM lock corresponding to the first subscriber identification module is deactivated.

2. The electronic device of claim 1, wherein the instructions are configured to cause the processor to display a SIM-lock screen including an icon for displaying a home screen corresponding to the first subscriber identification module through the display if the SIM lock corresponding to the first subscriber identification module is deactivated and a SIM lock corresponding to a second subscriber identification module is activated.

3. The electronic device of claim 2, wherein the instructions are configured to cause the processor to: sense a user input corresponding to the icon, and display the home screen corresponding to the first subscriber identification module if the user input is sensed.

4. The electronic device of claim 2, wherein the SIM-lock screen comprises an authentication code input region, and
   the instructions are configured to cause the processor to:
   identify an authentication code input through the authentication code input region, and deactivate the SIM lock corresponding to the second subscriber identification module based on the identified authentication code,
   wherein the second subscriber identification module activates the SIM lock.

5. The electronic device of claim 1, wherein the instructions are configured to cause the processor to: display a user interface for selecting the at least one subscriber identification module included in the SIM card, and display a screen corresponding to the at least one subscriber identification module selected corresponding to a user input.

6. The electronic device of claim 5, wherein the instructions are configured to cause the processor to display a SIM-lock screen corresponding to the selected at least one subscriber identification module if the SIM-lock corresponding to the selected at least one subscriber identification module is activated.

7. The electronic device of claim 1, wherein the SIM card comprises at least one of an embedded SIM, a virtual SIM, a SIM of a GSM system, a USIM of a UMTS system, a UIM of a CDMA system, or a RUIM.

8. The electronic device of claim 4, wherein the instructions are configured to cause the processor to receive an user input when the electronic device is in a SIM-lock state or in a sleep state, release the SIM-lock state or the sleep state of the electronic device in response to the user input, and display a screen on the touchscreen display, the screen including a first user interface for releasing the SIM lock corresponding to the second subscriber identification module and a second user interface for entering into the home screen corresponding to the first subscriber identification module without releasing the SIM lock corresponding to the second subscriber identification module.

9. A method for operating an electronic device, the method comprising:
   identifying whether a SIM lock corresponding to a first subscriber identification module is activated based on at least one subscriber identification module included in a SIM card mounted on the electronic device; and
   displaying a screen corresponding to the first subscriber identification module if the SIM lock corresponding to the first subscriber identification module is deactivated.

10. The method of claim 9, further comprising:
    displaying a SIM-lock screen including an icon for displaying a home screen corresponding to the first subscriber identification module if the SIM lock corresponding to the first subscriber identification module is deactivated and a SIM lock corresponding to a second subscriber identification module is activated.

11. The method of claim 10, further comprising:
    sensing a user input corresponding to the icon; and
    displaying the home screen corresponding to the first subscriber identification module if the user input is sensed.

12. The method of claim 10, wherein the SIM-lock screen comprises an authentication code input region, and
    the method further comprises:
    receiving an authentication code input through the authentication code input region; and
    deactivating the SIM lock corresponding to the second subscriber identification module based on the received authentication code,
    wherein the second subscriber identification module activates the SIM lock.

13. The method of claim 9, further comprising:
    displaying a user interface for selecting the at least one subscriber identification module included in the SIM card;
    selecting the at least one subscriber identification module corresponding to a user input; and
    displaying a screen corresponding to the at least one selected subscriber identification module.

14. The method of claim 13, further comprising:
selecting at least one subscriber identification module; and
displaying a SIM-lock screen corresponding to the selected at least one subscriber identification module if the SIM lock corresponding to the selected at least one subscriber identification module is activated.

15. The method of claim 12, further comprising:
receiving an user input when the electronic device is in a SIM-lock state or in a sleep state;
releasing the SIM-lock state or the sleep state of the electronic device in response to the user input; and
displaying a screen on a touchscreen display, the screen including a first user interface for releasing the SIM lock corresponding to the second subscriber identification module and a second user interface for entering into the home screen corresponding to the first subscriber identification module without releasing the SIM lock corresponding to the second subscriber identification module.

* * * * *